April 14, 1931. J. L. HECHT 1,800,795
LOCKING DEVICE FOR RIM EXPANDING WEDGES
Filed June 15, 1927 2 Sheets-Sheet 2
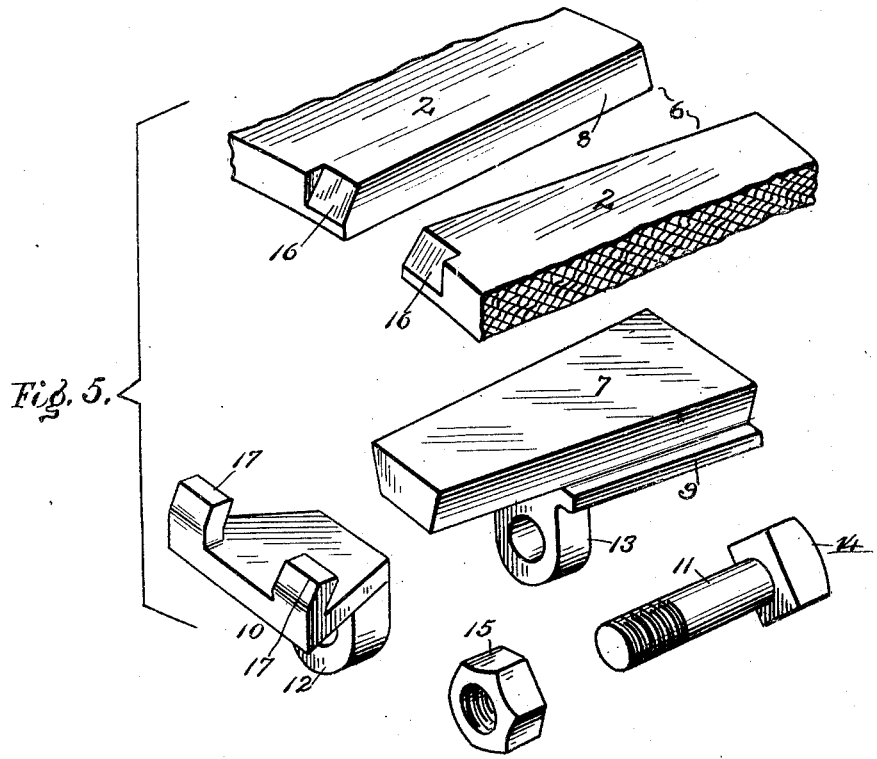
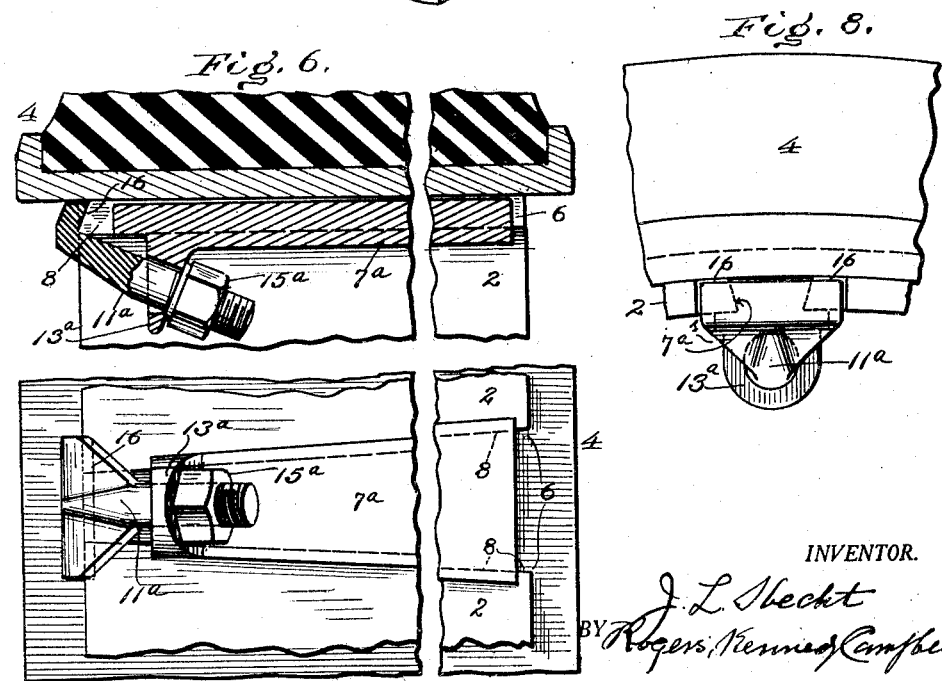
INVENTOR.
J. L. Hecht
BY Rogers, Kennedy Campbell
ATTORNEYS Patented Apr. 14, 1931

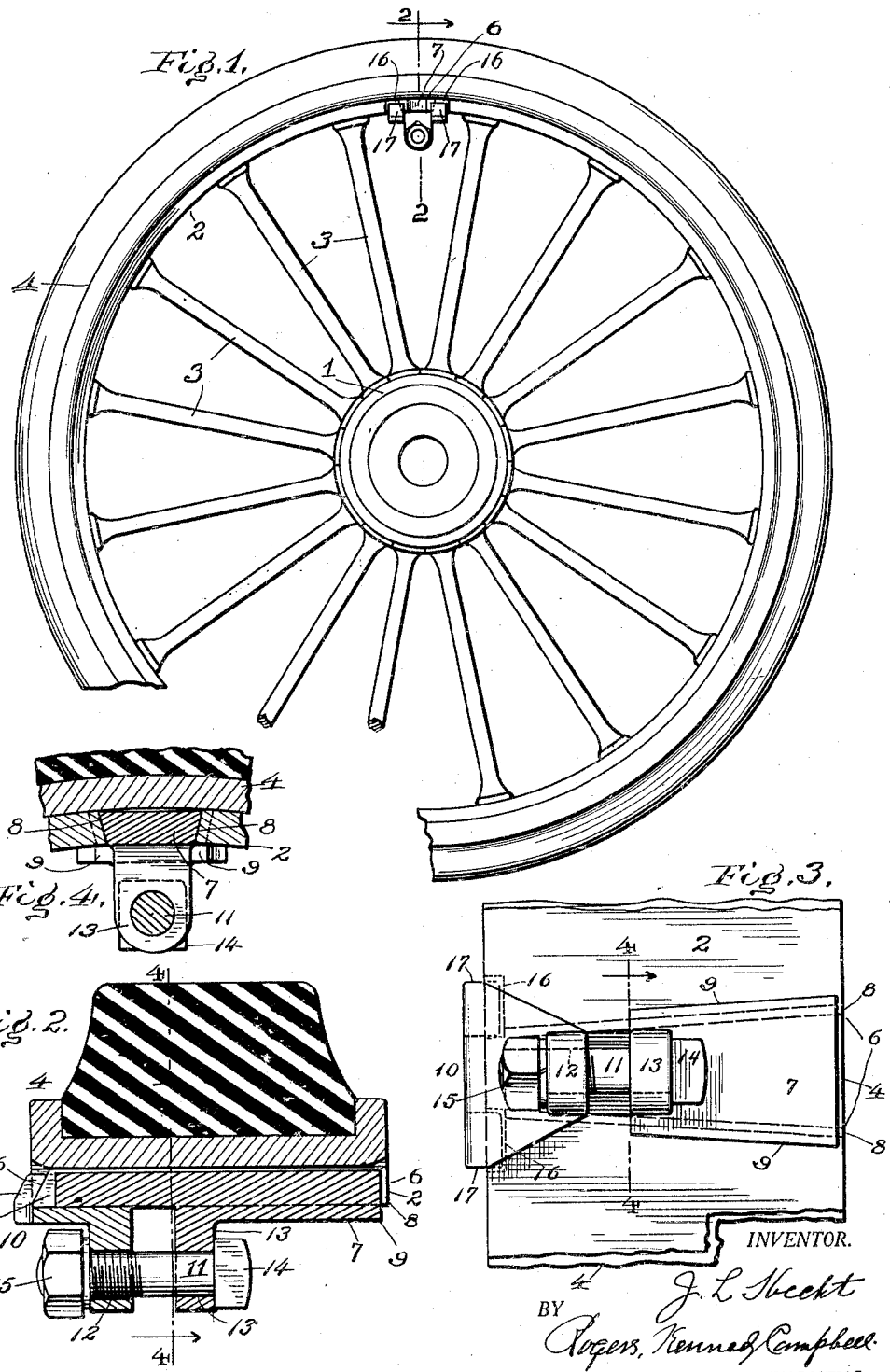

1,800,795

UNITED STATES PATENT OFFICE

JOSEPH L. HECHT, OF DAVENPORT, IOWA, ASSIGNOR, BY MESNE ASSIGNMENTS, TO FRENCH & HECHT, INC., OF DAVENPORT, IOWA, A CORPORATION OF IOWA

LOCKING DEVICE FOR RIM-EXPANDING WEDGES

Application filed June 15, 1927. Serial No. 198,893.

This invention relates to means for securing tires to wheel rims to enable the tires to be readily removed or demounted, and the invention has reference more particularly that type of tire mounting in which a split rim is forcibly expanded within the surrounding tire ring by a wedge acting between the ends of the split rim.

The aim of the invention is to prevent the wedge from accidentally becoming loose or backing out after being once forced to its seat to expand the rim; and the invention consists of the novel form and arrangement of parts which will be described in detail in the specification to follow and the novel features of which will be set forth in the appended claims.

In the accompanying drawings:

Fig. 1 is a side elevation of a wheel and attached tire, the same having my invention embodied therein in one form.

Fig. 2 is an axial section on an enlarged scale on the line 2—2 of Fig. 1.

Fig. 3 is an inside plan view of the parts shown in Fig. 2.

Fig. 4 is a cross section on the line 4—4 of Fig. 2, as viewed in the direction of the arrows on said line.

Fig. 5 is a perspective view of the ends of the split rim, and the expanding wedge and operating parts, showing the said parts in disassembled relation.

Fig. 6 is a view similar to Fig. 2 showing the invention in a different form.

Fig. 7 is an inside plan view of the same.

Fig. 8 is an end elevation of the same.

Referring to the drawings:

Referring to Figs. 1 to 5, the wheel shown by way of example to illustrate the invention, comprises a hub 1, rim 2, and spokes 3 connected at their ends respectively with the hub and rim, the said rim being encircled by a tire ring 4 carrying as usual a rubber tire.

The rim is split or open as at 6 to receive a rim expanding wedge 7 of which there may be one only as shown, or the rim may be split at a number of points to receive a corresponding number of wedges. The ends of the split rim are inclined towards each other axially of the wheel to form wedging surfaces 8 to cooperate with the inclined edges of the wedge, and these surfaces slope inwardly towards each other in a radial direction as best shown in Figs. 4 and 5, and the wedge is formed at its opposite sides with flanges 9 bearing against the inner sides of the rim adjacent its ends, whereby the wedge is maintained in circumferential alignment with the rim ends.

The wedge is held to its seat with the rim in expanded condition by means of a member in the form of a clip 10 which is engaged with the edge of the rim at the opposite sides of the opening therein, and which extends inwardly along the inner side of the wedge and is engaged with the wedge by a threaded element in the form of a bolt 11 extending loosely through aligned holes in lugs 12 and 13 projecting inwardly from the clip and wedge respectively. A head 14 on the bolt bears against the inner face of the lug 13, and a nut 15 is screwed on the opposite end of the bolt and bears against the outer face of the lug 12.

The engagement of the clip with the rim is preferably an interlocking relation of the parts, which in the form of the invention illustrated is effected by chamfering or recessing the edges of the rim ends as at 16 and providing the clip 10 at its outer end with hooks or lips 17 to engage in said recesses, the engaging faces of the hooks and recesses being inclined outwardly. By this means the outer end of the clip will be maintained in engagement with the rim and will be prevented from falling away from the same, so that the parts will be retained in their proper operative relations after assemblage.

It will be noted that the clip 10 extends inwardly from the edge of the rim and along the inner side of the wedge, and that the bolt and nut are likewise disposed at the inner side of the wedge and wholly within the limits of the rim. In other words these parts do not project beyond the edges of the rim or tire. This I deem of advantage in that the bolt and nut will be prevented from coming into contact with extraneous objects on the roadway in the use of the wheel, and will thereby be protected against injury or marring.

Other forms of interlocking engagement of the clip with the rim than that shown may be adopted without departing from the limits of the invention, provided that the construction is such as to maintain the clip in position and preserve its proper operative relation to the wedge.

In Figs. 6, 7 and 8 a different form of the invention is illustrated, the main difference from the form first described residing in the fact that the threaded element 11ª in the present case is formed as an integral part or extension of the clip, and not as a separate and detachable bolt as in the first case described. On reference to these figures it will be seen that the wedge 7ª as before is formed with an inwardly extending lug 13ª having a hole therethrough, but in this case the inner face of the lug is inclined or sloped outwardly. The clip as before is formed with a hooked end engaging in recesses in the edges of the rim ends, and from this hooked end of the clip the threaded element 11ª in the form of a stem, extends obliquely at right angles to the sloping face of the lug and through the hole in the lug, a nut 15ª being screwed on the threaded end of the stem and bearing against the sloping face of the lug. Due to the oblique disposition of the stem, its threaded end and the nut thereon are disposed some distance inward of the inner face of the wedge and are therefore more readily accessible than in the arrangement of parts first described.

In the assemblage of the parts in mounting the tire on the rim, the tire is first slipped over the rim and the wedge inserted between the wedging surfaces on the rim ends. By suitable means, for instance as by means of a hammer or other appropriate tool, the wedge is forcibly driven home to its seat to cause the rim to expand tightly within the surrounding tire. The clip is now engaged with the rim ends at the edges thereof and the threaded member entered in the holes in the lugs on the clip and wedge if the form of the invention shown in Figs. 1 to 5 is employed, and finally the nut screwed on the end of the threaded member and brought tightly up against the lug on the clip. Or, if the form of the invention shown in Figs. 6, 7 and 8 is adopted, then the threaded member is passed through the hole in the lug on the wedge and the nut screwed on the end of the member engaged tightly with the lug. In either case the wedge will be held by the nut and threaded member, firmly and tightly to its seat and will be effectually prevented from backing out or displacement.

While the invention has been shown and described as being embodied in certain detailed forms of the parts, it will be understood that these details may be changed by the skilled mechanic without departing from the limits of the invention; and further it will be understood that the invention is not limited to any particular form or arrangement of the parts, except insofar as such limitations are specified in the claims.

Having thus described my invention, what I claim is:

1. In combination with a split wheel rim having its ends provided with wedging surfaces, a rim expanding wedge seated between said wedging surfaces and provided with an inwardly extending lug having a hole therethrough and provided with a sloping side face, a member engaging the edge of the rim adjacent its ends, a threaded stem on said member extending obliquely through the lug, and a nut screwed on the stem and engaging the sloping face of the lug.

2. In combination with a split wheel rim having its ends provided with wedging surfaces sloping axially and formed in its side edges adjacent said ends with recesses sloping outwardly, a wedge seated between said wedging surfaces, a member provided with lips having sloping surfaces engaged with said sloping surfaces of the recesses to interlock therewith and thereby be held against radial displacement, and means engaged respectively with said member and with the wedge, and operable through the medium of said member to hold the wedge to its seat.

In testimony whereof, I have affixed my signature hereto.

JOSEPH L. HECHT.